United States Patent [19]

Katz et al.

[11] Patent Number: 5,263,097
[45] Date of Patent: Nov. 16, 1993

[54] PARAMETER NORMALIZED FEATURES FOR CLASSIFICATION PROCEDURES, SYSTEMS AND METHODS

[75] Inventors: Alan J. Katz, Dallas; Michael T. Gately, Plano, both of Tex.

[73] Assignee: Texas Instruments Incorporated, Dallas, Tex.

[21] Appl. No.: 735,403

[22] Filed: Jul. 24, 1991

[51] Int. Cl.$^5$ .................................... G06K 9/20
[52] U.S. Cl. ............................. 382/48; 382/14; 382/36; 395/21
[58] Field of Search ............. 382/14, 39, 15, 28, 382/48, 36; 395/20, 21, 62

[56] References Cited

U.S. PATENT DOCUMENTS

| | | | |
|---|---|---|---|
| 3,626,368 | 12/1971 | Lee | 382/15 |
| 4,025,920 | 3/1977 | Reitboeck et al. | 382/14 |
| 4,566,123 | 1/1986 | Yoshida | 382/15 |
| 4,773,099 | 9/1988 | Bokser | 382/14 |
| 4,933,872 | 6/1990 | Vandenberg et al. | 382/14 |
| 5,040,133 | 8/1991 | Feintuch et al. | 382/28 |

OTHER PUBLICATIONS

Rumelhart et al, "Learning Internal representations by errors propagation" *Parallel Distributing Processing*, vol. 1, pp. 318–362: MIT Press, Cambridge, Ma. (1986).
Waibel, "Modular Construction of Time-Delay Neural Networks for Speech Recognition", *Neural Comp.*, vol. 1, pp. 39–46, (1989).
Scofield, et al., "Patten Class Degeneracy in an Unrestricted Storage Density Memory", *Neural Information Processing Systems*, D. Anderson, ed. (1988).
Hampshire, J. B. and Waibel, A. 1990, DARPA, 1988 Neural Network Study, pp. 203–210.
David E. Rumelhart et. al.; Nature vol. 323, Oct. 9, 1986; "Learning Representations by Back Propagating errors".
Roth, Michael W., IEEE Transactions on Neural Networks, vol. 1 No. 1. Mar. 1990; "Survey of Neural Network Technology for Automatic Target Recognition".

*Primary Examiner*—Joseph Mancuso
*Attorney, Agent, or Firm*—Richter Darryl Burke; James C. Kesterson; Richard L. Donaldson

[57] ABSTRACT

This application discloses a method for distinguishing targets from clutter, comprising the steps of inputting data, extracting feature information from said data, extracting parameter information from said data, normalizing said features with said parameter information to produce parameter normalized feature information, inputting said parameter normalized feature information into the classification procedure, operating said classification procedure on said parameter normalized feature information, and outputting target and clutter data. Classification systems are also disclosed.

27 Claims, 5 Drawing Sheets

| IMAGE SET | NUMBER OF IMAGES | LOCATION | PARTIALLY OCCLUDED TARGETS |
|---|---|---|---|
| 1 | 27 | G | NO |
| 2 | 2 | G | NO |
| 3 | 7 | S | NO |
| 4 | 5 | S | YES |
| 5 | 20 | N | YES |

Fig. 8

| TEST CASE | PROBABILITY OF DETECTION | PROBABILITY OF FALSE ALARM |
|---|---|---|
| A | 0.85 ± 0.06 | 0.18 ± 0.06 |
| B | 0.82 ± 0.03 | 0.20 ± 0.03 |
| C | 0.99 ± 0.01 | 0.00 ± 0.01 |
| D | 0.96 ± 0.01 | 0.05 ± 0.01 |

Fig. 9

PARAMETER NORMALIZED FEATURES FOR CLASSIFICATION PROCEDURES, SYSTEMS AND METHODS

NOTICE

© Copyright, Texas Instruments Incorporated 1991. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to products and methods pertaining to pattern recognition and classification procedures, and neural networks.

BACKGROUND OF THE INVENTION

Target recognition and pattern classification involves the evaluation of new observations on the basis of past observations to distinguish targets or desired patterns from background clutter. This task is complicated by the complex and non-stationary nature of real world environments and often requires a multitude of classification techniques. Moreover, the computational overhead of many practical classification problems strain serial computer resources.

With respect to the inherent complexity of pattern classification problems, the nonstationary nature of many classification problems makes acquiring a representative data set for training a classifier difficult. The likelihood that the classification scheme would be able to recognize the desired pattern is small without representative training data. The likelihood that a single classification scheme would be able to recognize multiple desired patterns is small as well. This robustness issue is central to pattern recognition solutions in radar identification, speech recognition, and automatic target recognition. In radar identification, parameters describing a radar emitter vary dramatically, as warring parties deliberately change the frequencies and pulse repetition intervals from their peace-time values to disguise the identity of the emitter. In speech recognition, the meanings and sounds of words and phrases change as a function of the culture (or dialect), speaker, or context. In the automatic recognition of targets, targets exist in a vast array of settings, lighting conditions, times of the day and year, orientations, and positions.

With respect to the computational requirements, neural networks provide parallel computational implementations. These networks embody an approach to pattern recognition and classification based on learning. Example patterns are used to train these networks to isolate distinctions between the particular patterns and background clutter for proper classification.

SUMMARY OF THE INVENTION

This application discloses a method for distinguishing targets from clutter, comprising the steps of inputting data (e.g., one-dimensional or multi-dimensional data, such as digitized infrared imagery, digitized TV imagery, speech samples, or radar samples), extracting feature information (e.g., contrast-based and texture-based) from the data, extracting parameter information (e.g., lighting, time-of-day, ambient temperature, and context of scene, sensor characteristics) from the data, normalizing the feature information with said parameter information to produce parameter normalized feature information, inputting said parameter normalized feature information into the classification procedure (e.g., parametric and non-parametric techniques and one-class, two-class, or multi-class classification procedures), operating said classification procedure on said parameter normalized feature information, and outputting target and clutter data. In addition, the step of preprocessing the data to highlight feature or parameter information after the first step may be included. Similarly, the step of inputting parameter information after the third step may be included as well. The advantages of this method are it normalizes the classifier inputs for the particular data inputs encountered, which increases the robustness of the overall classification process.

The invention may also be incorporated into a classification system that comprises a data input (e.g., one-dimensional or multi-dimensional data, such as digitized infrared imagery, digitized TV imagery, speech samples, or radar samples), feature extraction procedures to extract feature information (e.g., contrast-based and texture-based) from the data input, parameter extraction procedures to extract parameter information (e.g., lighting, time-of-day, ambient temperature, and context of scene, sensor characteristics) from the data input, normalizing procedures that normalize the feature information with the parameter information to produce parameter normalized feature information, and classification procedures (e.g., parametric and non-parametric techniques and one-class, two-class, or multi-class classification procedures) that use parameter normalized feature information to distinguish targets from background clutter and output target and background clutter data. In addition, the classification system may also comprise preprocessing procedures to highlight feature or parameter information contained in the data input.

The invention may be implemented in software and hardware configurations as well. In particular, the invention is implemented with modular neural networks.

BRIEF DESCRIPTION OF THE DRAWINGS

Further features and advantages will become apparent from the following and more particular description of the various embodiments of the invention, as illustrated in the accompanying drawing, wherein:

FIG. 8 shows an overview of Image Sets.

FIG. 9 shows the network results, which are expressed as $P_d$, the probability of detection and $P_{fa}$, the probability of false alarms.

DETAILED DESCRIPTION OF THE PREFERRED EMBODIMENTS

Figure 1:
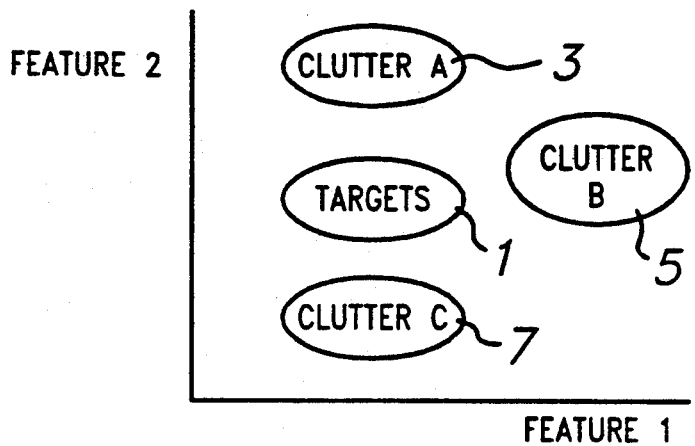
FIG. 1 is a representation of the target and background clutter in a feature space.

Robust pattern recognition and target classification problems and applications generally attempt to distinguish preferred targets from background clutter. As discussed, supra, different data inputs may vary significantly. As shown in FIG. 1, Target 1 and Clutter A 3, Clutter B 5, and Clutter C 7 may be described by a corresponding feature set $$F=(f_1, f_2, \ldots, f_n).$$

As shown in FIG. 1, if the features are chosen correctly, Target 1 and Clutter A 3, Clutter B 5, and Clutter C 7 converge on different locus locations in the feature space F. These locations or groups correspond to classes in the classification context.

Figure 2:
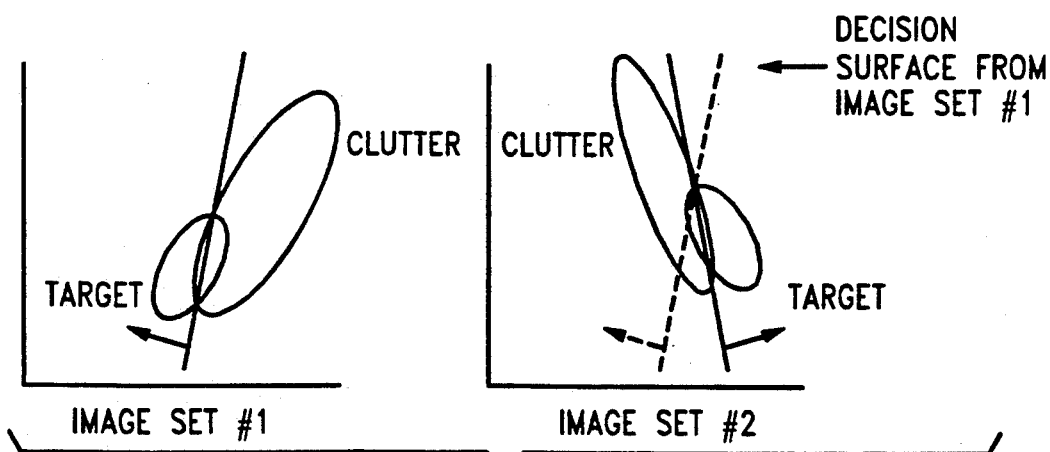
FIG. 2 is a representation of the variable statistical meanings of target and clutter from image to image, resulting in translations, rotations, and reflections of the decision surface.

As shown in FIG. 2, Target 1 and Clutter A 3, B 5, and C 7 in FIG. 1 are not necessarily stationary in real-world environments. As the environment varies, targets and background clutter vary independently or jointly from other targets or background clutter. The target representation may be stationary when the clutter is not and vice versa. In particular, targets and clutter are spearable in the n-dimensional feature space for Image Set #1 of which $I_a$ is a member. Similarly, target and clutter points from $1_b$ separate in the n-dimensional feature space for Image Set #2 of which $1_b$ is a member. The clusters of target and clutter points (and, hence, the decision surfaces) shift and rotate in complex ways in the n-dimensional feature space from image $1_a$ to image $1_b$. As a result, there may be little correlation between the set of decision surfaces defined by the data from $1_a$ and those defined by the data from $1_b$. Similarly, there may be little correlation between the set of decision surfaces defined by the data from Image Set #1 and those defined by the data from Image Set #2.

Please not that the Image Sets #1 and #2 and the particular images $1_a$ and $1_b$ may be generalized to Data sets #1 and #2 and data samples $1_a$ and $1_b$. Whereas these techniques are described in conjunction with images, which are typically two-dimensional, the same techniques apply to one-dimensional or multi-dimensional data sets as well.

Given the differences between the Target 1 and Clutter A 3, B 5, and C 7 in the feature space shown in FIG. 1, a one-class, two-class, or multiple-class classifier may be designed and implemented. Different classification procedures may be needed for different target and clutter characteristics or parameters or different images. In turn, these procedures often process large amounts of data and involve large numbers of calculations. These procedures often require parallel implementations to function in real time or near real time applications. The robustness of classification procedures is dependent upon the data used to develop the classifier and involves a large numbers of calculations, which often require parallel implementations to function in real time or near real time applications.

Figure 3:
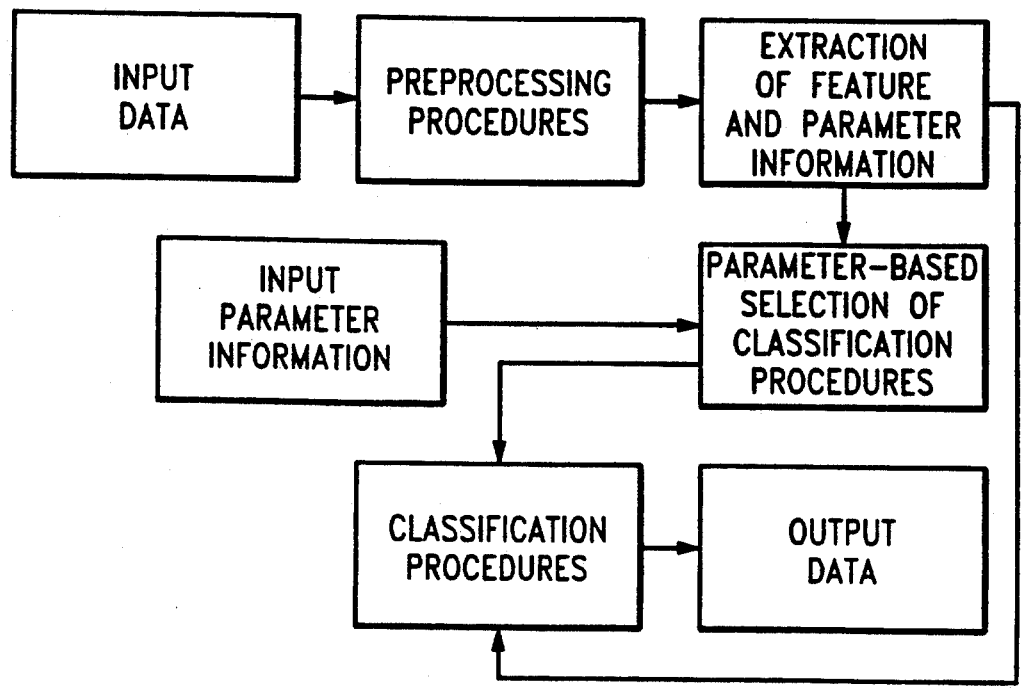
FIG. 3 is the first preferred system configuration.

FIG. 3 shows the first preferred system configuration. As shown, data (e.g., digitized infrared imagery, digitized TV imagery, speech samples, or radar samples) is inputted into the system. Preprocessing procedures then preprocess the data to highlight certain features and diminish environmental effects, such as sensor effects, etc. The system then extracts the desired feature information. Parameter-based selection procedures then determine the appropriate classification procedures to evaluate this feature information and distinguish intended targets from background clutter. The parameter information may be inputted directly into the system or extracted from the inputted information or both. Although the extraction of feature and parameter information occurs concurrently in the system diagram shown, this is not mandatory. The appropriate classification procedure typically uses the feature information to distinguish intended targets from background clutter, but may also use the parameter based mapping of feature information as well. These procedures may be implemented into parallel hardware architectures, such as neural networks.

In particular, in the first preferred embodiment, the inputted data comprises infrared (IR) and television (TV) images of intended targets in addition to background clutter. In particular, the data comprises five sets of bore-sighted infrared (IR) and daytime television (TV) images (256×256 pixels). FIG. 8 shows the number of images in each image set, the location codes, and which image sets have partially occluded targets. Each image set includes views of the targets from different viewing angles and at different distances. Locations S and G were mostly open fields with scattered trees, whereas location N was more heavily forested.

As discussed in relation to FIG. 3, supra, numerous procedures are used to preprocess the inputted imagery in the first preferred embodiment. In particular, the first preprocessing step identifies regions in the image of high contrast and with high probability of containing a target to examine first, which drastically reduces the overall processing time. Other preprocessing procedures known to those skilled in the art that utilize thresholds, signal processing techniques, or filtering techniques to enhance input data and optimize the system may be used as well. The actual preprocessing procedures used varies with the characteristics of the input data, the the feature and parameter information, the classification procedures, and the intended targets and background clutter.

As discussed in relation to FIG. 3, supra, eight contrast-based features, and eight texture-based features (e.g., intensity contrast, intensity standard deviation, and signal-to-noise radio) are then extracted from the screened regions in the first preferred embodiment. The actual selection of features is an engineering choice that may vary from application to application. For each screened area in an IR image, the corresponding set of pixels in the TV image is marked and features are extracted and vice versa. As a result, features from the same pixel locations in the IR and TV images are combined to form a composite feature vector with 32 features. Since the use of TV features or IR features alone makes the separation of targets and clutter more difficult, the first preferred embodiment fuses the information from the two sensors helps distinguish targets from clutter. In addition to the 32 features, the inventors extract 12 global features (e.g., total luminosity, maximum image contrast, and overall edge content) from each IR/TV image pair. These global features make up the parameter space P and provide information that relates similar images and differentiates divergent images.

As discussed in relation to FIG. 3, supra, the first preferred embodiment utilizes mapping information in parameter-based selection procedures, defined by the parameter set P, to determine the appropriate classification procedures. In particular, since P defines a family of mappings, the complex classification may be viewed as comprising the following steps: the mapping $M_p$ from the s-dimensional parameter space P to the function space $F=\{M_F^1, M_F^2, \ldots M_F^p\}$, which is embodied in the selection procedures and the mappings $M_F^i$ from the n-dimensional features space F to the output space $\{0,1\}$, which is embodied in the classification procedures. The order of the mappings $M_p$ and $M_f^i$ can be reversed, discussed supra, as suggested by J. B. Hampshire and A. Waibel in "Connectionist Architectures for Multi-Speaker Phoneme Recognition, "*Advances in Neural Information Processing Systems* 2, D. S. Touretzky, ed., pp. 203-210. (1990).

Figure 4:
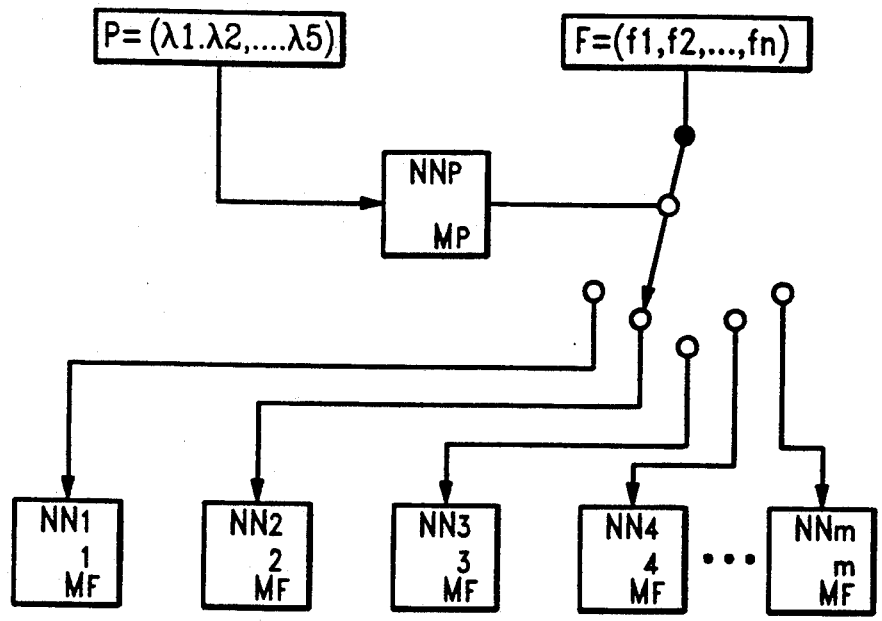
FIG. 4 is an conceptual illustration of how the parameter settings P drive the switch to $NN_p$ to route feature space F to a network $NN_i$, which maps the feature data to a binary output space.

FIG. 4 elaborates on these parameter-based selection procedures by conceptually showing how the parameter settings P drive the switch to $NN_p$ to route feature space F a network $NN_i$, which maps the feature data to a binary output space. The top network in the figure performs the mapping $M_p$, which is a switch for selecting one of the m classifiers in the second layer. The networks in the second layer are realizations of the mappings $M_{Fi}$.

These parameter based selection or mapping procedures helps maintain robustness, by determining the transformation of the classification task as a function of image parameters, even though the features and images themselves may be nonrobust. In short, it enables the system to select the appropriate classifier for the particular data inputs encountered. The features effectively depend on the parameter set $P=(\lambda_1 \lambda_2, \ldots \lambda_s)$, which varies from image to image and affects the feature data (e.g., lighting, time-of-day, ambient temperature, and context of scene, sensor characteristics). Since the features may vary independently as a function of P, variations in the parameter set P lead to complicated transformations of points in the feature space. As a result, whereas the original classification problem essentially maps data in the feature space F to some set of output classes (we consider only two output classes, targets and clutter), the selection procedures provide for an second mapping procedure that maps a family of mappings F, defined by the parameter set P, into a second family of mappings F, which is inputted into the classification procedure. This second mapping procedure is typically not deterministic in terms of relating the mappings and the parameters of P, so relevant examples must be used to derive the relationship between P and F.

As discussed in relation to FIG. 3, supra, the first preferred embodiment utilizes classification procedures, which incorporate target statistics to distinguish and isolate the target regions from background clutter. Although other classification techniques (e.g. parametric and non-parametric) and parallel and serial implementations may be used, the first preferred embodiment comprises a two-state, modular neural network classifier. The first stage consists of an $8 \times 5$ feedforward neural network, with eight analog input neurons—eight of the 12 global features (the other four play a small role in the mapping) are inputted, as well as five output neurons, which designate the mappings (MSB) for the five image sets. This network performs the mapping from the parameter space P to the function space F. The second state of the classifier contains five independent neural networks, which effect the mappings $M_{Fi}$. The structure of the five neural networks are $16 \times 1$, $6 \times 1$, $4 \times 1$, $9 \times 1$, and $14 \times 4 \times 1$. The number of input neurons is smaller than 32 because we only include features that are relevant to the classification (we use the relative magnitudes of the weight vectors associated with each input neuron to determine the relevant features). All neural networks are trained with the backpropagation learning algorithm, which was discussed in Rumelhart, D. E., Hinton, G. E., and Williams, R. J. "Learning internal representations by error propagation, " *Parallel Distributed Processing*, Vol. 1, pp. 318-362: MIT Press, Cambridge, Mass. (1986).

Modular neural network approaches are used to implement the classifiers in the second layer, which were discussed in Waibel, A., "Modular construction of time-delay neural networks for speech recognition, "*Neural Comp.* Vol. 1, pp. 39-46 (1989), typically require less training time than approaches that utilize a single large network to carry out the mappings, where the desired mappings are accomplished with several smaller neural networks. Moreover, the modular approach is a means to train the system on specific subsets of the feature data and, therefore, to control the nature of the mapping learned by the networks.

Figure 5:
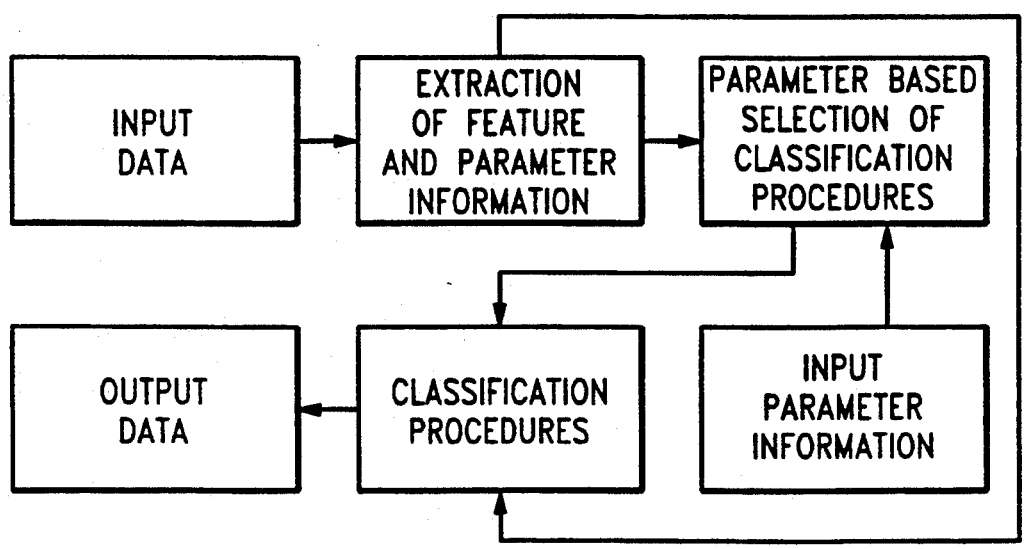
FIG. 5 is an alternate system configuration for the first preferred system configuration.

As shown in FIG. 5, alternate embodiments of the first preferred embodiment do not necessarily need the preprocessing step. As shown, data (e.g., digitized infrared imagery, digitized TV imagery, speech samples, or radar samples) is inputted into the system. The system then extracts the desired feature information. Parameter-based selection procedures then determine the appropriate classification procedures to evaluate this feature information and distinguish intended targets from background clutter. The parameter information may be inputted directly into the system or extracted from the inputted information or both. The appropriate classification procedure typically uses the feature information to distinguish intended targets from background clutter, but may also use the parameter based mapping of feature information as well. These procedures may be implemented into parallel hardware architectures, such as neural networks.

Figure 6:
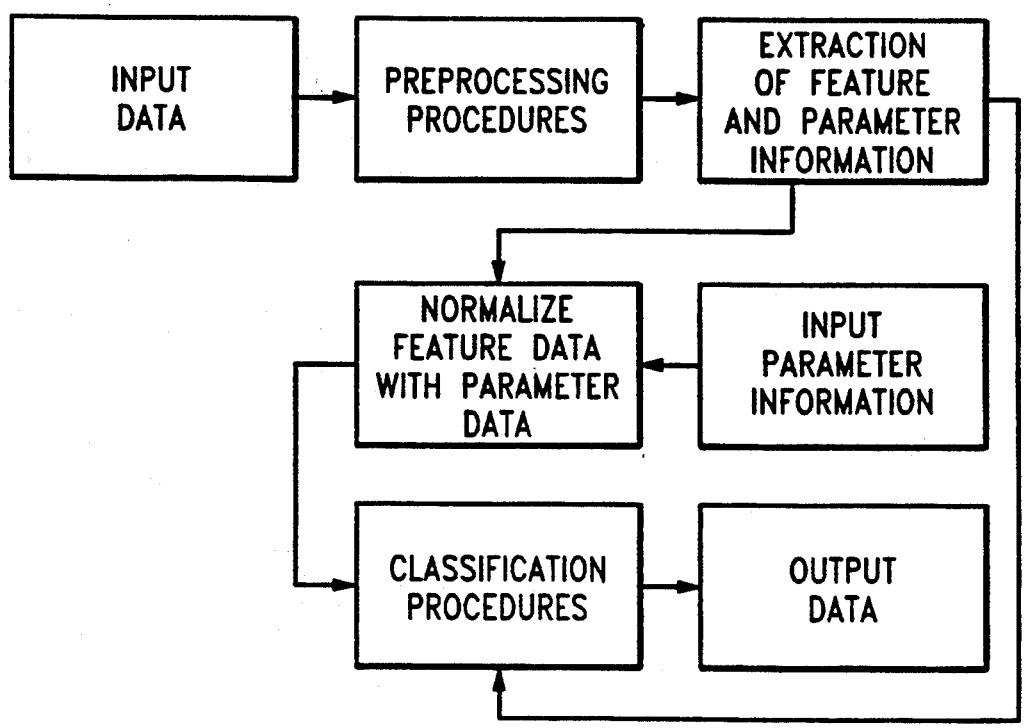
FIG. 6 is a second preferred system configuration.
Figure 7:
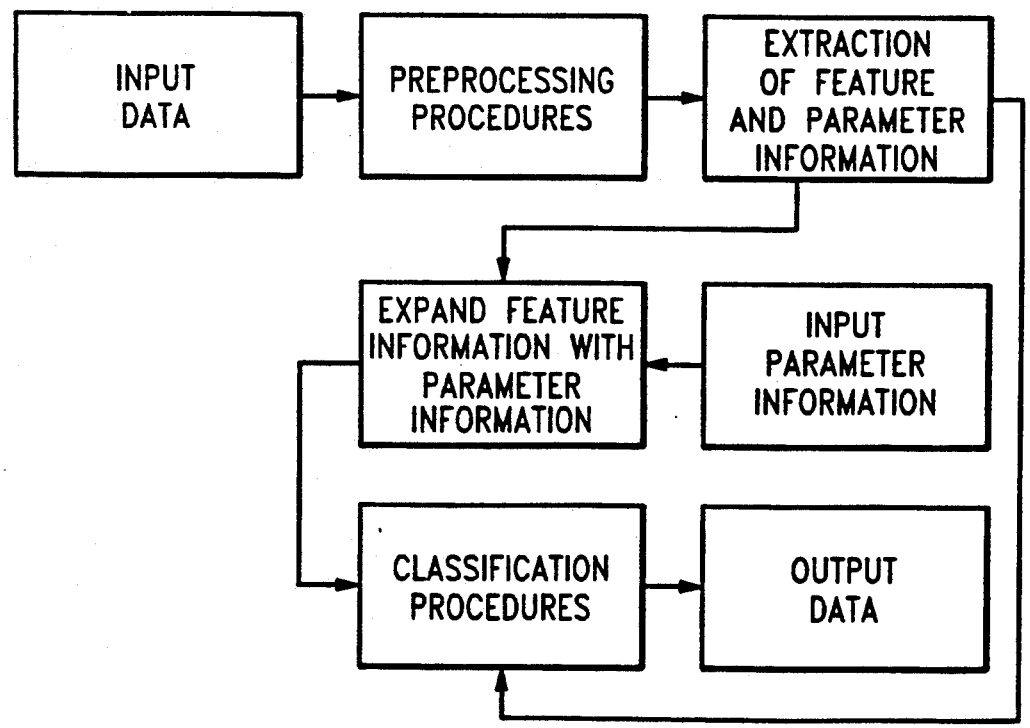
FIG. 7 is an third preferred system configuration.

Similarly, FIGS. 6 and 7 illustrate alternate preferred embodiments that utilize the parameter set P information differently. In the second preferred embodiment shown in FIG. 6, data (e.g., digitized infrared imagery, digitized TV imagery, speech samples, or radar samples) is inputted into the system. Preprocessing procedures then preprocess the data to highlight certain features and diminish environmental effects, such as sensor effects, etc. The system then extracts the desired feature information. Parameter-based selection procedures then determine the appropriate classification procedures to evaluate this feature information and distinguish intended targets from background clutter. The parameter information may be inputted directly into the system or extracted from the inputted information or both. Although the extraction of feature and parameter information occurs concurrently in the system diagram shown, this is not mandatory. The second preferred embodiment uses the parameter set P information to normalize the feature data prior to classification. The appropriate classification procedure typically uses the feature information to distinguish intended targets from background clutter, but may also use the parameter based mapping of feature information as well. These procedures may be implemented into parallel hardware architectures, such as neural networks, discussed, supra, in relation to the first preferred embodiment.

In the third preferred embodiment shown in FIG. 7, data (e.g., digitized infrared imagery, digitized TV imagery, speech samples, or radar samples) is inputted into the system. Preprocessing procedures then preprocess the data to highlight certain features and diminish environmental effects, such as sensor effects, etc. The system then extracts the desired feature information. Parameter-based selection procedures then determine the appropriate classification procedures to evaluate this feature information and distinguish intended targets from background clutter. The parameter information may be inputted directly into the system or extracted from the inputted information or both. Although the extraction of feature and parameter information occurs concurrently in the system diagram shown, this is not mandatory. The third preferred embodiment uses the parameter set P information to expand the original feature space F n to n+s dimensions, which the classification procedures then map from an enlarged feature space F to the output space: $M_F': R^{n+s} \rightarrow \{0,1\}$. These procedures may be implemented into parallel hardware architectures, such as neural networks.

Alternate embodiments could utilize the parameter information as used in each of the preferred embodiments, discussed supra, simultaneously or in conjunction with one another. As a result, alternate embodiments could use the same parameter information to select the appropriate classification procedure, normalize the feature information, or enlarge the feature set or some combination thereof. Similarly, alternate embodiments could use some of the same parameter information to select the appropriate classification procedure, normalize the feature information, or enlarge the feature set or some combination thereof.

Alternate embodiments could also accept numerous forms or combinations of data and data types besides digitized infrared imagery and digitized TV imagery, such as speech signals, radar signals, etc. Alternate embodiments could also very the size and type of feature set information and parameter set information as well. Alternative embodiments could also employ other techniques to produce neural networks. Besides backpropagation, other gradient descent learning techniques or other supervised learning techniques could be used as well. For instance, Reduced Coulomb Energy procedures, which were discussed in C. L. Scofield et al., "Pattern class degeneracy in an unrestricted storage density memory," in *Neural Information Processing Systems*, Dana Z. Anderson, Ed., New York: AIP, 1988, could be used in place of the backpropagation learning techniques. In addition, data compression techniques could be used as well, such as infomax techniques, competitive learning algorithms, or other vector quantization techniques. Alternate classifying techniques may be inputed as well, such as parametric and non-parametric techniques. All embodiments may be implemented in software and hardware configurations as well.

Thus, while the preferred embodiment and additional embodiments of the invention have been disclosed, it should be understood that many changes in detail may be made as a matter of engineering choices without departing from the spirit and scope of the invention, as defined by the appended claims. In particular, alternate procedures that share the same functionally as the procedures discussed, supra, are plainly within the scope of the invention.

Test results (which are averages over 48 runs) for the modular system are shown in Table 2. Network results are expressed as $P_d$, the probability of detection and $P_{fa}$, the probability of false alarms. $P_d$ is the number of targets correctly identified as targets divided by the total number of targets. $P_{fa}$ is the number of clutter objects incorrectly identified as targets divided by the total number of objects identified as targets. Two sets of experiments were conducted. The first set of experiments include (A) two-stage, modular system (numbers represent an average over 48 runs). The second set of experiments include (B) 32×16×1 network (numbers represent an average over six runs).

Each of the five networks at the second stage train on feature data from three-quarters of the images (randomly selected) from the respective image set: all the image sets are therefore, represented in the training set. The neural network at the first stage trains on global features extracted from all images in the training set. The remaining one-quarter of the images serve as the test set. Test results (which are averages over 48 runs) for the modular system are shown in FIG. 9, Row A. The error bars represent the standard deviation for results from the various runs. The two-stage classifier generalizes well even though the input set is not invariant over the data domain. The generalization rate of the first-stage neural network is 0.96 and indicates that the first-stage neural network performs well as a switch to the appropriate network in the second stage. When no errors are made at the first stage, the test results for the classifier did not improve.

To test how essential the global features are for proper generalization, we built a 32×16×1 neural network that did not include the global features, and we trained the network on three-quarters of the image data (chosen the same way as above). The number of training cycles and the overall training time were an order of magnitude greater for the single network than for the modular system (1 hr vs. 10 hr on a Texas Instruments Explorer II LISP machine with a conjugate-gradient descent version of back propagation); the training and generalization results for the single network, which are shown in FIG. 9, Row B, were within the error bars of the results for the modular system. These results did not improve when we reduced either the number of input neurons or the number of hidden neurons. We conclude that the advantage of the two-stage, modular system over the single network for this data set is training efficiency.

The inventors ran a second set of experiments to demonstrate the generalization advantages of the two-stage approach. The data were two single-sensor (IR) image sets, one with 30 images and the second with 90 images. Sixteen texture-based features were extracted from each high contrast region. Not only were the decision surfaces in the two sets uncorrelated (0.58), but there was considerable overlap between the target cluster in one image set and the clutter cluster in the second set. We expected that the age set and the clutter cluster in the second set.

The training sets for the two-stage, modular and the single networks were identical. The results are shown in FIG. 9, Rows C and D. The generalization rates for the two-stage, modular system were nearly perfect ($P_D = 0.99 \pm 0.01$ and $P_{FA} = 0.00 \pm 0.01$). The structure of the two neural networks, at the second stage were both 16×1. The single neural network had the structure 16×32×1 (networks with smaller numbers of hidden units gave worse results while the results did not improve with a network with 64 hidden units). The generalization rates for the single network were $P'_d=0.96\pm0.01$ and $P_{fa}=0.05\pm0.01$. These results are worse than the results for the two-stage, modular system.

The values and ranges disclosed herein are given for a preferred embodiment of the present invention, of course these values may vary as the parameters are changed. Therefore it is to be understood that many changes in detail may be made as a matter of engineering choices without departing from the spirit and scope of the invention, as defined by the appended claims.

We claim:

1. A method for distinguishing targets from clutter, comprising the steps of
   (a) inputting data containing target information and background information and preprocessing said data to highlight selected information to ultimately improve target recognition;
   (b) extracting feature information from said data;
   (c) extracting parameter information from said data;
   (d) normalizing said feature information with said parameter information to produce parameter normalized feature information;
   (e) inputting said parameter normalized feature information into an appropriate classification procedure;
   (f) operating said appropriate classification procedure on said parameter normalized feature information; and
   (g) outputting said target information and said background information.

2. The method of claim 1, wherein said data is a format selected from the group consisting of one-dimensional, two-dimensional, and multi-dimensional or a combination thereof.

3. The method of claim 1, wherein said data is a format selected from the group consisting of digitized imagery, speech signals, and radar signals or a combination thereof.

4. The method of claim 1, wherein parallel architectures are used to select the appropriate classification procedure.

5. The method of claim 4, wherein said parallel architectures comprise neural networks.

6. The method of claim 1, wherein parallel architectures are used to implement said appropriate classification procedure.

7. The method of claim 6, wherein said parallel architectures comprise neural networks.

8. The method of claim 1, wherein said feature information is a format selected from the group consisting of contrast-based and texture-based or a combination thereof.

9. The method of claim 1, wherein said appropriate classification procedure distinguishes a plurality of classes from one another.

10. The method of claim 1, further comprising the step of inputting parameter information after step (c).

11. The method for distinguishing targets from clutter of claim 1, wherein said selected information highlighted by said preprocessing is selected from the group consisting of feature information and parameter information.

12. The method for distinguishing targets from clutter of claim 1, wherein said selected information highlighted by said preprocessing is used to select said appropriate classification procedure.

13. A classification system, comprising
   (a) a preprocessor to highlight selected information of a data input containing target information and background information to ultimately improve target recognition;
   (b) a feature extractor to extract feature information from said data input;
   (c) a parameter extractor procedures to extract parameter information from said data input;
   (d) a normalizer that normalizes said feature information with said parameter information to produce parameter normalized feature information; and
   (e) a classifier that uses said parameter normalized feature information to distinguish target information from said background information and output said target information and background information.

14. The classification system of claim 13, wherein said data input is a format selected from the group consisting of one-dimensional, two-dimensional, and multidimensional.

15. The classification system of claim 13, wherein said data input a format selected from the group consisting of is digitized imagery, speech signals, and radar signals.

16. The classification system of claim 13, wherein parallel architectures are used to implement said switching procedures.

17. The classification system of claim 13, wherein parallel architectures are used to implement said classification procedures.

18. The classification system of claim 13, wherein said feature information is a format selected from the group consisting of contrast-based and texture-based.

19. A classification hardware system, comprising
   (a) a preprocessor to highlight selected information of a data input containing target information and background information to ultimately improve target recognition;
   (b) a feature extractor to extract feature information from said data input;
   (c) a parameter extractor to extract parameter information from said data input;
   (d) a normalizer procedures that normalizes said feature information with said parameter information to produce parameter normalized feature information; and
   (e) a classifier that use said parameter normalized feature information to distinguish said target information from said background information and output said target information and said background information.

20. A classification software system, comprising
   (a) a preprocessor to highlight selected information of a data input containing target information and background information to ultimately improve target recognition;
   (b) a feature extractor to extract feature information from said data input;
   (c) a parameter extractor to extract parameter information from said data input;
   (d) a normalizer procedures that normalizes said feature information with said parameter information to produce parameter normalized feature information; and
   (e) a classifier that use said parameter normalized feature information to distinguish said target information from said background information and output said target information and said background information.

21. A classification system, comprising
   (a) a preprocessor to diminish environmental effects of a data input containing target information and background information to ultimately improve target recognition;
   (b) a feature extractor to extract feature information from said data input;
   (c) a parameter extractor procedures to extract parameter information from said data input;
   (d) a normalizer that normalizes said feature information with said parameter information to produce parameter normalized feature information; and
   (e) a classifier that uses said parameter normalized feature information to distinguish target information from said background information and output said target information and background information.

22. The classification system of claim 21, wherein said environmental effects are selected from the group consisting of sensor effects and climatic effects.

23. The classification system of claim 21, wherein said preprocessor also detects environmental effects which are used to select said classifier.

24. A classification system, comprising
   (a) a preprocessor to diminish environmental effects of a data input containing target information and background information to ultimately improve target recognition;
   (b) a feature extractor to extract feature information from said data input;
   (c) a parameter extractor procedures to extract parameter information from said data input; and
   (d) a classifier that uses said parameter information and said feature information to distinguish target information from said background information and output said target information and background information.

25. The classification system of claim 24, wherein said preprocessor also detects environmental effects which are used to select said classifier.

26. A classification system, comprising
   (a) a preprocessor to highlight selected information of a data input containing target information and background information to ultimately improve target recognition;
   (b) a feature extractor to extract feature information from said data input;
   (c) a parameter extractor procedures to extract parameter information from said data input; and
   (e) a classifier that uses said parameter information and said feature information to distinguish target information from said background information and output said target information and background information.

27. The method for distinguishing targets from clutter of claim 26, wherein said selected information highlighted by said preprocessing is used to select said classifier.

* * * * *